United States Patent Office 3,470,066
Patented Sept. 30, 1969

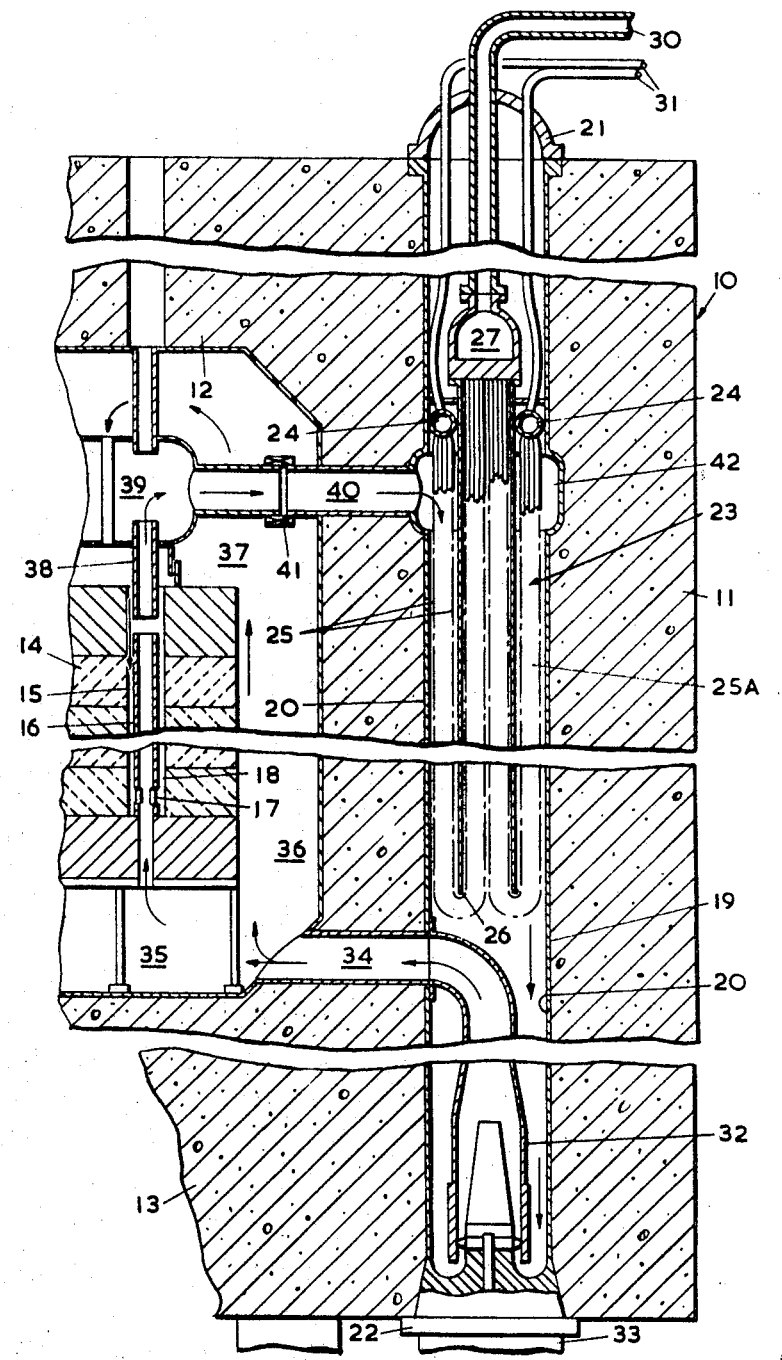

3,470,066
NUCLEAR REACTOR HAVING A CONCRETE PRESSURE VESSEL
Walter Oldham Livsey and Alexander Gillies Young, Whetstone, England, assignors to The English Electric Company Limited, London, England, a British company
Filed June 20, 1966, Ser. No. 558,720
Claims priority, application Great Britain, June 18, 1965, 25,930/65
Int. Cl. G21c 11/02, 15/00; G21d 9/00
U.S. Cl. 176—60  2 Claims

ABSTRACT OF THE DISCLOSURE

A concrete combined pressure vessel/biological shield for a nuclear reactor comprises a single wall with a cylindrical vertical outer surface and has vertical cylindrical penetrations in said wall, in each of which there are closely fitted a boiler and a coolant circulator coaxial with the boiler.

---

This invention relates the nuclear reactors including a concrete pressure vessel having a single vertically-extending concrete wall, which together with top and bottom portions of the pressure vessel, surrounded by said wall, defines an enclosed reactor space therein.

In such a reactor it has in the past been proposed to include heat exchanger units, such as steam boilers, inside the reactor space. This may necessitate a larger reactor space, and therefore a larger and more expensive pressure vessel, than if for example the heat exchanger units were outside the pressure vessel. The latter expedient is not wholly satisfactory since it requires reactor coolant to be brought out of the pressure vessel, which not only involves an increase in pumping losses and in the number of penetrations through the pressure vessel wall, but is also detrimental to safety.

The same remarks apply for example to dry storage facilities for storing spent fuel elements.

One arrangement that has been proposed is to provide a double-walled cylindrical vessel having an annular space between the walls, boilers and/or dry-storage facilities being located within the annular space. Such a vessel is expensive to make since, among other things it involves the use of nearly twice as much shuttering for the concrete as for a single-walled vessel. It also creates a considerable voidage between the reactor space and the outside face of the pressure vesssel, and does not noticeably decrease the overall horizontal dimensions of the pressure vessel. It is desirable therefore to decrease both the total mass and the horizontal dimensions of the pressure vessel, while providing a minimum of voidage and avoiding both the need to make two walls and the need to bring reactor coolant gas outside the pressure vessel.

According to the invention, at least one vertical cylindrical open-ended penetration is formed in said wall.

At least one said penetration may be open at both ends thereof and extend the full height of said wall; and preferably the open ends of the said penetrations are closed by removable pressure-resistant closures.

According to a preferred feature of the invention, the or each said penetration is arranged to contain a heat exchanger uint, first duct means for a primary coolant fluid being provided in the said wall between the or each heat-exchanger unit and the reactor space and second duct means, for a second fluid to be heated by said primary coolant fluid in the or each heat exchanger unit, leading therefrom and vertically out of the said wall through the corresponding penetration.

According to another preferred feature of the invention, the reactor includes circulating means mounted in the or each said penetration containing a heat exchanger unit and arranged to circulate said primary coolant fluid between the corresponding heat exchanger unit and first duct means.

Preferably, the or each said circulating means is arranged to be removable through one end of the corresponding said penetration.

One nuclear reactor in a preferred form according to the invention will now be described by way of example and with reference to the accompanying drawing, which is a sectional elevation showing part of the reactor.

The reactor includes a concrete pressure vessel 10 comprising a single generally-cylindrical vertical hollow wall 11 closed at top and bottom by a concrete pile cap 12 and floor 13 respectively, and containing a graphite moderator core 14 having a number of vertical fuel channels 15, only one of which is shown, formed therein and containing nuclear fuel (not shown) within a coaxial graphite sleeve 16, at the bottom of which are radial holes 17 communicating with an annular space 18 in the fuel channel around the sleeve 16.

Within the wall 11 of the vessel 10 are a number (for example twelve) of vertical cylindrical open-ended penetrations 19 extending the whole height of the wall 11. The penetrations 19 are preferably equally spaced around the pressure vessel. Each penetration 19 has a relatively thin steel liner 20, a removable pressure-resistant top cap 21 and a removable pressure-resistant bottom closure 22.

Fitting within each liner 20 is a boiler unit 23 comprising a pair of steam drums 24 from each of which there extends, longitudinally of the penetration 19, a nest of parallel finned double-pass boiler tubes, indicated diagrammatically by chain-dotted lines at 25, which reverse at the bottom of the boiler unit and which are supported by a frame indicated at 26.

The other end of the two nests of tubes 25 is fixed to a central water inlet header 27 at the top of the boiler unit 23. The portion of each nest of tubes 25 outside the frame 26 constitutes a superheater section 25A.

Feedwater is supplied from a feedwater pump (not shown) through central feed pipes 30. Each feed pipe 30 passes from above the pile cap 12, through the corresponding top cap 21 to the corresponding inlet header 27, and steam leaves each boiler unit 23 from the steam drums 24 through steam pipes 31 passing through the top cap 21 and leading to a steam turbine (not shown).

Steam is generated in the tubes 25 of each boiler unit 23 by indirect heat exchange with a reactor coolant gas which is circulated by axial blowers 32, each of which is mounted vertically and coaxially in the bottom of a penetration 19 and each of which is driven by an electric motor 33 mounted on the corresponding bottom closure 22. From the blowers 32 the gas passes through ducts 34 to a bottom plenum 35 below the core 14. Here the gas flow splits, part of the gas entering the bottom of the fuel channels and part flowing up an annulus 36 around the core 14 to an upper plenum 37 above the core; the latter gas then flows downwardly through the annuli 18 in the fuel channels to the bottom, where it passes through the holes 17 in the sleeves 16 to join the rest of the gas. All the gas then flows upwardly through the sleeves 16, where it is heated by the fuel therein. The gas passes from each fuel channel 15 through a duct 38 into a hot box 39, and thence through horizontal ducts 40, fitted with expansion joints 41, into an annular space 42 formed in each penetration 19 adjacent the top of the boiler unit 23. From there the gas flows downwardly in contact with the boiler tubes 25, giving up heat to the water therein so as to form steam, and so passes to the blowers 32. The general direction of gas flow is indicated by arrows in the drawing.

It will be seen that each penetration 19 with its liner 20 and boiler unit 23 constitute a complete boiler; each boiler unit 23 may if desired be made so that it can be removed upwardly out of its liner 20 on removal of the pipes 30, 31 and of the top cap 21.

Each boiler unit 23 may if desired be fitted with baffles extending transversely across part of the boiler unit so as to guide the gas in a zig-zag path through the unit, and the boiler tubes 25 need not be finned, especially if such baffles are provided.

Each blower 32 is removable with its motor 33 through the bottom of the corresponding penetration 19. Each motor 33 may be a single unit with its blower and may be arranged inside the corresponding penetration 19.

The invention is applicable to any nuclear reactor having a concrete pressure vessel the wall of which is thick enough to accommodate a boiler or boilers between the outer and inner surfaces of the wall. The reactor need not be of the gas-cooled type; nor need the moderator core be of graphite; nor need the coolant flow be exactly as described herein. The circulating means for reactor coolant may comprise gas blowers or pumps of suitable type.

Suitable temperature control means may be provided to obtain a temperature distribution as nearly isothermal as possible in the concrete between the boiler units 23 and the outside face of the pressure vessel wall 11, and between one boiler unit 23 and the next. Such temperature control means may for example comprise an arrangement wherein some or all of the outlet pipes of the pressure vessel cooling system (not shown) are routed through the concrete so as to give up some heat to the concrete in places where it is colder than the said outlet pipes: alternatively some other suitable heat source may be incorporated within the concrete, for example ducts for steam bled from the turbine or from the steam pipes 31. It will be noted that each water inlet header 27 can be made easily removable with or without the rest of the boiler unit, since access to it through the top of the corresponding penetration 19 is readily possible.

Means for resisting gas pressures acting on the end caps 21 and circulator closures 22 may for example comprise local anchors in the concrete or pre-stressing cables running parallel to the penetrations 19.

It will be realised that the overall diameter of the pressure vessel can if desired be reduced between the penetrations, so saving concrete. Construction of the penetrations, using a standard cylindrical formwork, is relatively easy.

The invention is not confined to cases in which it is boiler units that are installed in the penetrations 19. Dry storage means may for example be provided therein for storing spent fuel elements in longitudinally-extending tubes, some coolant gas being arranged to pass over the tubes, to cool them.

We claim:
1. In a nuclear reactor comprising a concrete vessel in the form of a single vertical wall having a cylindrical outer surface and an inner surface which together with inner surfaces of top and bottom portions of the vessel defines an enclosed pressure-tight reactor space, a fuel-containing reactor core within said reactor space, a plurality of vertical cylindrical boilers and a corresponding number of rotary circulators for circulating reactor coolant through said core and boilers; an arrangement wherein each said boiler is fitted snugly in a separate vertical cylindrical pressure-tight penetration formed in, and extending the full height of, said single wall between said inner and outer surfaces thereof, said penetrations being spaced circumferentially and completely encircled by concrete and communicating with the reactor space only through a coolant inlet duct and a coolant outlet duct, and each said circulator being mounted coaxially below the corresponding boiler and in the same said penetration.

2. A reactor according to claim 1 wherein each boiler comprises a plurality of water tubes extending vertically and connected at their ends to headers at the upper end of the boiler whereby the headers can be reached through the top of the corresponding penetration.

References Cited
UNITED STATES PATENTS

| | | | |
|---|---|---|---|
| 3,091,582 | 5/1963 | Bradley | 176—60 |
| 3,149,046 | 9/1964 | Boyd | 176—60 X |
| 3,242,981 | 5/1966 | Hutchinson et al. | 176—65 X |
| 3,287,226 | 11/1966 | Webb | 176—65 X |
| 3,300,389 | 1/1967 | Packman et al. | 176—60 X |

FOREIGN PATENTS

| | | |
|---|---|---|
| 866,037 | 4/1961 | Great Britain. |
| 936,198 | 9/1963 | Great Britain. |
| 1,022,003 | 3/1966 | Great Britain. |
| 1,232,143 | 10/1960 | France. |

REUBEN EPSTEIN, Primary Examiner

U.S. Cl. X.R.
176—65, 87